PHOTOGRAPHIC APPARATUS AND METHOD

Original Filed March 6, 1969 2 Sheets-Sheet 1

INVENTOR.
ALBERT J. BACHELDER

BY

Brown and Mikulka
and
Robert E. Gorb
ATTORNEYS

PHOTOGRAPHIC APPARATUS AND METHOD

Original Filed March 6, 1969 2 Sheets-Sheet 2

INVENTOR.
ALBERT J. BACHELDER

BY

Brown and Mikulka
and
Robert E. Corb
ATTORNEYS

United States Patent Office

Re. 28,054
Reissued June 25, 1974

28,054

PHOTOGRAPHIC APPARATUS AND METHOD

Albert J. Bachelder, Lexington, Mass., assignor to Polaroid Corporation, Cambridge, Mass.

Original No. 3,647,441, dated Mar. 7, 1972, Ser. No. 804,819, Mar. 6, 1969, which is a continuation-in-part of application Ser. No. 744,912, July 15, 1968, now Patent No. 3,652,281. Application for reissue Feb. 21, 1973, Ser. No. 334,218

Int. Cl. G03c 5/54

U.S. Cl. 96—29 R 13 Claims

Matter enclosed in heavy brackets [ ] appears in the original patent but forms no part of this reissue specification; matter printed in italics indicates the additions made by reissue.

ABSTRACT OF THE DISCLOSURE

A self-developing camera for use with a photographic film unit including a photosensitive sheet and a second sheet secured in face-to-face relation by external binding strips secured to the lateral margins of the sheets and adapted to be processed to produce a visible image by a liquid processing agent distributed between the sheets in a uniform thin layer at least coextensive with the exposed area of the photosensitive sheet. The camera includes a pair of juxtaposed pressure-applying rolls for distributing the processing liquid between the sheets, and one of the rolls includes annular grooves near its ends for receiving lateral edge portions of the binding strips during movement of the film unit between the rolls to relieve the pressure on the edge portions of the binding strips while the medial sections of the rolls engage the sheets and are spaced apart by engagement of the end sections of the rolls with the binding strips at the lateral edges of the film unit.

This application is a continuation-in-part of the copending U.S. Patent application of A. J. Bachelder et al. Ser. No. 744,912, filed July 15, 1968, *and now U.S. Patent No. 3,652,281.*

The aforementioned application and the U.S. patent of Edwin H. Land No. 3,415,644, granted Dec. 10, 1968, disclosed a self-developing film unit including a photosensitive sheet and a transparent second or image-receiving sheet bound together in face-to-face relation by binding elements secured to the outsides of the sheets around and to the margins thereof. The photosensitive and second sheets are rectangular, and the binding elements, in addition to retaining the sheets together, also function as a mask defining a rectangular area of the photosensitive sheet adapted to be exposed through the transparent sheet and thereafter processed to produce a visible image between the sheets. This image is formed, preferably by diffusion transfer of image-forming substances from the image-recording sheet, to an image-receiving layer on the second sheet and is visible through the second sheet which is retained in superposition with the photosensitive sheet after processing is complete. Processing is effected by advancing the film unit between a pair of pressure-applying members to spread a viscous processing liquid in a thin layer between the sheets from a rupturable container coupled to the sheets adjacent to transverse edge of the area to be processed. The processing liquid is required to be spread in a uniformly thin layer at least coextensive with the exposed area of the photosensitive sheet and extending at least to and preferably beyond the edges of the exposed area defined by the edges of the binding elements.

The processing liquid is distributed within the film unit between the photosensitive and second sheets by moving the film unit, commencing with the container, through a conversion passage between a pair of pressure-applying members, preferably rollers mounted for rotation about substantially parallel axes. At the start of the liquid distribution process, the liquid is dispensed from the container between the sheets as an elongated mass located adjacent a transverse edge of the exposed area and extending substantially from side-to-side thereof, and is then advanced toward the opposite edge of the exposed area as the film unit is advanced between the pressure-applying members to form a thin layer of uniform thickness at least coextensive with the exposed area. The presure-applying members (rolls) are, as a rule, resiliently biased toward one another, and the thickness of the layer of liquid is a function of the spacing between the rolls in the region of the exposed area. This spacing between the medial portions of the pressure-applying members is, in turn, a function of the thickness of the lateral margins of the film unit which are engaged between the end sections of the pressure-applying members and retain the pressure-applying members apart from one another. Thus, to provide a space between the sheets in the region of the exposed area in which the processing liquid is distributed, the combined thickness of the binding elements and sheets at the lateral margins of the film unit are greater than the combined thicknesses of the sheets in the region intermediate the binding elements defining the exposed area, so that the spacing between the sheets in the region in which the processing liquid is spread will be approximately equal to the total thickness of the binding elements at each lateral edge.

In a preferred form of film unit described in the aforementioned application and patent, the binding elements defining [.he] *the* lateral edges of the exposed area take the general form of thin strips of sheet material adhered around and to the lateral margins of the sheets such that each binding element includes two lateral marginal sections, each adhered to a lateral margin of one of the sheets. Thus, the spacing between the medial portions of the sheets in the region of the exposed area will be approximately twice the thickness of the sheet material of which the binding elements are formed.

It will be apparent that during spreading of the processing liquid, the pressure-applying members will tend to retain the lateral margins of the sheets in face-to-face contact while the medial portions of the sheets in the region of the exposed area are permitted to separate under the pressure of the processing liquid; and that there will be transition regions near the lateral edges of the exposed area in which the sheets are deformed or bent apart from one another and are neither in contact nor spaced by a distance approximating the required thickness of the layer of processing liquid. Accordingly, the thickness of the layer of processing liquid in these narrow lateral transition regions bordering the exposed area will not be uniform, and the quantity of liquid available for the image formation process will be insufficient for proper image formation. There is a tendency for this condition of insufficient liquid processing reagent near the lateral edges of the exposed area to be worsened due to the fact that portions of the photosensitive and second sheets, lying outside of and immediately adjacent the exposure area and underlying the binding elements, absorb the processing liquid, thereby further reducing the quantity of liquid available to process the exposed photosensitive sheet and form an image in the lateral regions of the film unit immediately adjacent the binding elements.

This problem of insufficient liquid processing agent at the lateral edges of the exposed area of the photosensitive sheet is partially alleviated by distributing the processing liquid beyond the lateral edges of the exposed area into the region between the sheets underlying the combined masking and binding element. To facilitate distribution of the processing liquid laterally beyond the edges of the exposed area, the edges of the binding element at each side of the image area are offset from one another. Specifically, the lateral edges of the lateral marginal sections of the binding elements secured to the second or image-receiving sheet (through which the photosensitive sheet is exposed and the image is viewed) are located inwardly toward the center of the film unit beyond the lateral edges of the lateral marginal sections of the binding elements secured to the photosensitive sheet, thereby permitting spacing of the portions of the sheets underlying the lateral marginal sections of the binding element secured to the image-receiving sheet.

An object of the present invention is to provide, during processing of a film unit of the type described, additional spacing between the sheets of the film unit in lateral regions immediately adjacent the exposed area of the film unit in order to insure that there will be sufficient liquid available for complete processing of the photosensitive sheet and formation of a visible image in the exposed area completely to the lateral edges thereof.

Other objects of the invention will in part be obvious and will in part appear hereinafter.

The invention accordingly comprises the apparatus possessing the construction, combination of elements and arrangement of parts and the process of the several steps and the relation and order of one or more *of* such steps with respect to each of the others, which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 2:
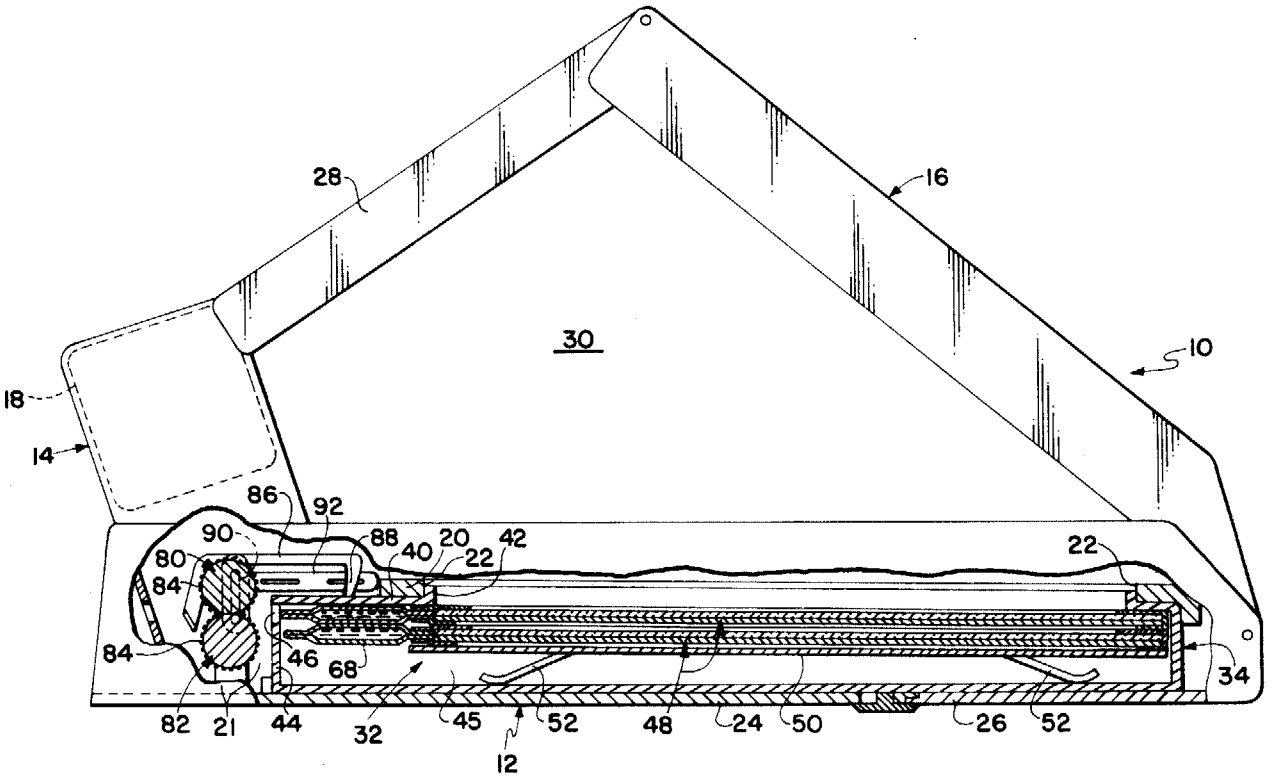
FIG. 2 is an elevational view, partially in section, of a self-developing camera embodying the invention and adapted to perform the method thereof.

Reference is now made to FIG. 2 of the drawings wherein there is illustrated a camera 10 embodying the invention. Camera 10 is of the type shown and described in detail in the copending U.S. patent application of Edwin H. Land et al. Ser. No. 655,850, filed July 25, 1967, *and now abandoned,* and the U.S. patent applications of Irving Erlichman, Ser. No. 713,766, filed Mar. 18, 1968, *now U.S. Pat. No. 3,511,152,* and Ser. No. 763,883, filed Sept. 30, 1968, *now U.S. Pat. No. 3,589,253.* This camera is of the folding type, comprising a housing including three relatively movable sections, namely, a rear or main section 12, a forward section 14, and an intermediate section 16, all pivotally coupled to one another for movement between a folded position and the erect or operative position shown. Forward section 14 incorporates a lens and shutter assembly which may be of a conventional type and also includes a source of power for the camera such as an electrical motor generally designated 18.

The rear or main housing section 12 of the camera is adapted to contain a film pack or assembly of photographic film units and includes means for locating the film pack with a film unit thereof in position for exposure. For this purpose, the rear housing section includes a forward wall 20 having a rectangular opening 22 therein for transmitting light to a film unit positioned for exposure behind or to the rear of wall 20; sidewalls 21; and a rear wall 24 cooperating with the forward and side walls to provide a chamber for receiving and containing a film pack. A door 26 is located at the rear of housing section 12 to provide access to the interior of the housing section to permit loading of a film pack into the camera.

Intermediate housing section 16 includes a mirror (not shown) located at an angle with respect to the optic axis of the lens and the plane of the film for reflecting light from the lens within housing section 14 toward a film unit positioned within rear housing section 12 behind forward wall 20. The camera housing also includes a connecting member 28 pivotally joined to forward housing section 14 and intermediate housing section 16 to assist in supporting the housing sections in the operative position shown, and a collapsible bellows 30 coupled with the housing sections and cooperating therewith to provide a lighttight chamber through which light is transmitted from the lens in housing section 14 via the mirror in housing section 16 to a film unit positioned for exposure within housing section 12.

Figure 1:
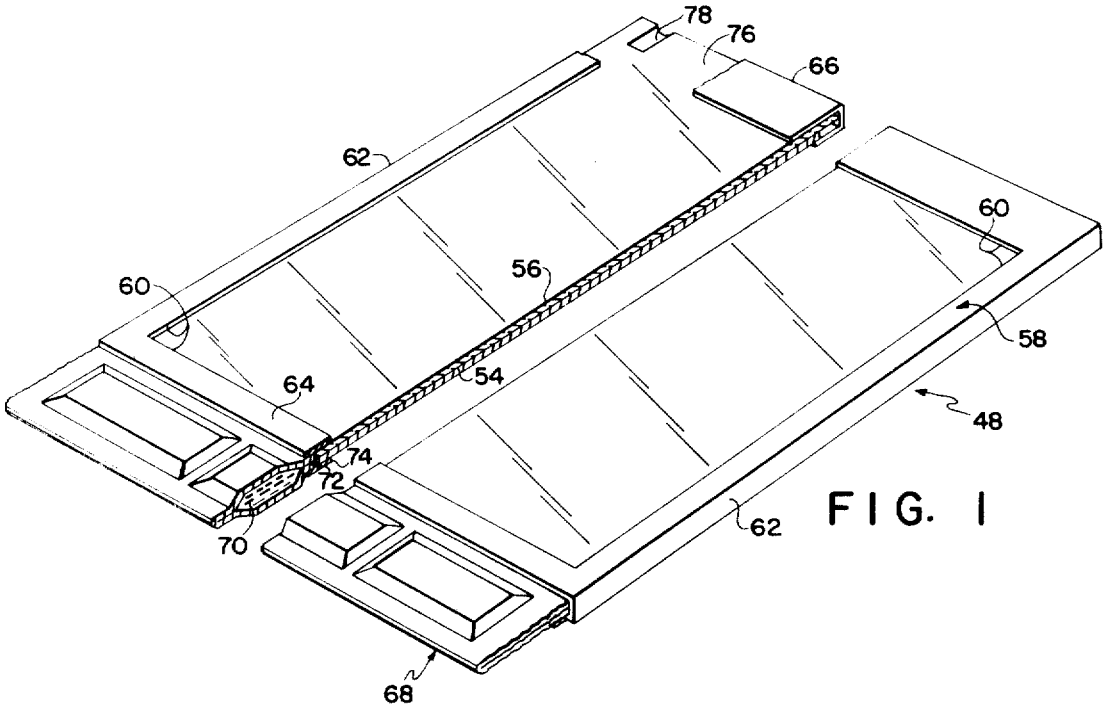
FIG. 1 is a perspective view, partially in section, with parts broken away of a self-developing film unit adapted to be employed in the apparatus and method of the invention.

Camera 10 is shown with a film pack or assemblage 32 mounted within the camera in position for exposure. Film pack 32 includes generally parallelepiped-shaped container 34 having a forward wall 40 provided with a rectangular exposure aperture 42 surrounded by a flange adapted to be engaged in opening 22 of forward wall 20 for properly locating the forward wall of the film pack; an end wall 44 provided with a narrow slot 46 through which a film unit exposed within the container may be withdrawn therefrom; and side walls 45 for holding and guiding the film units. The film pack is shown as containing a plurality of film units designated 48 and shown in greater detail in FIGS. 1 and 3 of the drawings. The film units are arranged in stacked relation on a support plate 50 biased by springs 52 toward forward wall 40 of container 34 for supporting the forwardmost film unit against the forward wall across aperture 42 in position to be exposed by light transmitted through aperture 42 and with an end (leading) of the film unit aligned with slot 46.

Film units 48 may be designed to produce a visible image by any of a number of different image-forming processes and, in the preferred form, are designed for the production of a positive photographic print in full color formed by a diffusion transfer process in which a photographic image-recording medium, including a photosensitive material such as silver halide, is exposed to light to form an image (latent) therein and is treated by wetting with a liquid processing agent to develop the image in the image-recording medium, form an imagewise distribution of transferable image-providing substances, and transfer the image-providing substances by diffusion to an image-receptive stratum in which they are immobilized to form a visible positive image.

A preferred embodiment of the film unit includes all of the materials and reagents required to produce a full-color photographic print by a process such as disclosed in the U.S. Patent of Howard G. Rogers No. 2,983,606, granted May 9, 1961, and includes the materials incorporated in a structure such as described in detail in the aforementioned 3,415,644 patent. Film unit 48 is illustrated as comprising a rectangular photosensitive or image-recording sheet 54 and a rectangular second or image-receiving sheet 56 substantially coextensive with the photosensitive sheet and arranged in superposed face-to-face relation therewith. A typical photosensitive sheet, described in greater detail in the aforementioned patents and adapted to be employed to produce multicolor transfer images obtained utilizing dye developers, comprises an opaque support for a layer of photosensitive material comprising strata containing selectively sensitized overlying silver halide emulsions and having associated therewith dye developers. Such a photosensitive layer may include three sets of silver halide emulsion and associated dye developer strata comprising, for example, red, green, and blue silver halide emulsion strata having associated therewith respectively, a cyan dye developer, a magenta dye developer, and a yellow dye developer. The dye developers are preferably selected for their ability to provide colors useful in producing a full-color image by a subtractive process in which each dye developer is immobilized or precipitated in exposed areas of the associated silver halide emulsion stratum as a consequence of development thereof, while in unexposed areas and partially exposed areas of the emulsions, the dye developer remains unreacted and diffusible, thereby providing an imagewise distributions of unoxidized dye developer which is transferred, at least in part, by diffusion to an image-receiving layer without altering the *image*-wise distribution of the dye developer, to form a reversed or positive image of the latent image in the emulsion.

The second or image-receiving sheet 56 comprises a transparent, dimensionally stable support and an image-receiving layer providing an appropriate environment for the formation of a diffusion transfer image, e.g., a dyeable layer, particularly an image formed in terms of dyes transferred from a [photsensitive] *photosensitive* layer located in adjacent, face-to-face relation with the image-receiving layer.

Sheets 54 and 56 are arranged in superposed, face-to-face relation with the photosensitive and image-receiving layers located innermost between the sheets and are secured together by a binding element 58 in the form of a rectangular sheet larger than either of the photosensitive or image-receiving sheets and secured to the two sheets at the margins thereof. Binding element 58 is in the general form of a frame having a large rectangular opening 60 defining the extent of the image produced in the film unit by exposure of the photosensitive sheet by light transmitted through the image-receiving sheet. Opening [22] *60* is surrounded by lateral edge portions 62, a leading end portion 64, and a trailing end portion 66, adhered to the outer surface of image-receiving sheet 56 at the margins thereof. Lateral edge portions 62 and trailing end portion 66 function as binding strips adhered to the image-receiving sheet, extending around the lateral edges and one transverse edge of the superposed sheets and adhered to the outer surface of the photosensitive sheet 56 at the margins thereof. The lateral and transverse edges of the binding element 58 defining exposure aperture 60 and the limits of the exposed area are offset from the lateral and transverse edges of the element; that is, they are spaced inwardly from the edges of the photosensitive and image-receiving sheets a greater distance than the lateral and transverse edges of the sections of the binding element secured to the photosensitive sheet for reasons which will be explained in greater detail hereinafter. Binding element 58 is opaque to actinic light and performs the multiple functions of retaining the photosensitive and image-receiving sheets in face-to-face relation; confining the liquid between the sheets preventing escape thereof from the film unit during spreading of the processing liquid; of a mask defining the exposed area of the area in which a visible transfer image is formed; and of a spacer for controlling the thickness of the layer of processing liquid distributed between the photosensitive and image-receiving sheets. In a preferred form of film unit adapted to produce a reflection print surrounded by a white border and viewed against a white background, at least binding element 58 is formed of a white material to provide a more aesthetically pleasing product.

Film unit 48 includes a container 68 of processing liquid 70, the container being of the type shown in U.S. Pat. No. 2,543,181, formed by folding a rectangular blank of a liquid-impervious sheet material medially and sealing the marginal sections of the blank to one another to form a cavity for containing processing liquid 70. The seal between longitudinal marginal sections 72 of the container is weaker than the end seals so that, upon the application of a predetermied compressive force to the walls of the container in the region of the liquid-filled cavity, there will be generated within the liquid hydraulic pressure sufficient to separate longitudinal marginal sections 72 throughout their length to the length of the cavity and the width of the area defined by opening 60, through which the processing liquid is discharged. Container 68 is attached to the sheets at the transverse edges thereof opposite trailing end portion 66 of binding element 58, preferably with the longitudinal edge of the container located closely adjacent or butted against the edges of the sheets and with the discharge passage of the container aligned with the facing surfaces of the sheets. The container is coupled to the sheets by means including end portion 64 of binding element 58 which is secured to one of longitudinal marginal sections 72 of the container and by a strip 74 secured to the transverse marginal section of sheet 54 and to the other longitudinal marginal section 72 of the container. End portion 64 and strip 74 are secured to the container and sheets 54 and 56 so as to bridge the gap between the container and sheets and cooperate to provide a liquidtight seal between the marginal sections of the container defining the discharge passage and the sheets and form a conduit for conducting the liquid from the container between the sheets at the transverse marginal portions thereof.

As previously noted, the film unit is adapted to be processed by applying compressive pressure to the film unit along a line extending transversely of the film unit and substantially perpendicular to the lateral edges thereof and to the exposed area. Compressive pressure is applied progressively, commencing in the region of the container and thence toward the opposite or trailing end of the film unit by moving the film unit, container foremost, through a passage or gap between a pair of juxtaposed, pressure-applying members. Compressive pressure is applied initially to container 68 generating hydraulic pressure within liquid 70 effecting rupture of the bond between marginal sections 72 and discharge of the liquid in the form of an elongated mass between sheets 54 and 56. Continued movement of the film unit between the pressure-applying members causes advancement of the mass of liquid between the sheets toward the opposite end thereof and spreading of the liquid as a thin layer 96 of predetermined thickness between and in contact with the photosensitive and image-receiving layers.

The processing liquid includes an agent for increasing the viscosity of the liquid so as to promote opening of the discharge passage of the container throughout substantially its entire length and facilitate the discharge of the liquid from the container and spreading of the liquid between the sheets. For this purpose, the liquid should be quite viscous and contain a film-forming material in quantities sufficient to impart a viscosity in excess of 1000 centipoises at a temperature of 20° C., and preferably of the order of 1000 to 200,000 centipoises at said temperature.

It has been the practice, in order to insure spreading of the processing liquid in a layer of predetermined uniform thickness at least coextensive with the exposed area, to provide a quantity of processing liquid in the container in excess of that required to form the layer between the sheets. Accordingly, film units of this type include means for collecting and retaining any excess processing liquid and preventing it from escaping from the film unit, and in the form shown, these means include structure for providing a trapping space within the film unit at the trailing end thereof in which excess processing liquid is collected and retained. To form this trapping space, image-receiving sheet 56 includes a trailing end section 76 extending beyond the trailing (transverse) edge of photosensitive sheet 54 to provide a space between the image-receiving sheet and trailing end section 66 of the binding element. Trailing end section 76 of image-receiving sheet 56 is embossed, near its lateral edges, toward the photosensitive sheet to provide ribs 78 for spacing the pressure-applying members apart from one another during movement of the trailing end of the film unit between the pressure-applying members so as to provide a space between the trailing end section 76 of the image-receiving sheet and the trailing end section 66 of the binding element.

Figure 3:
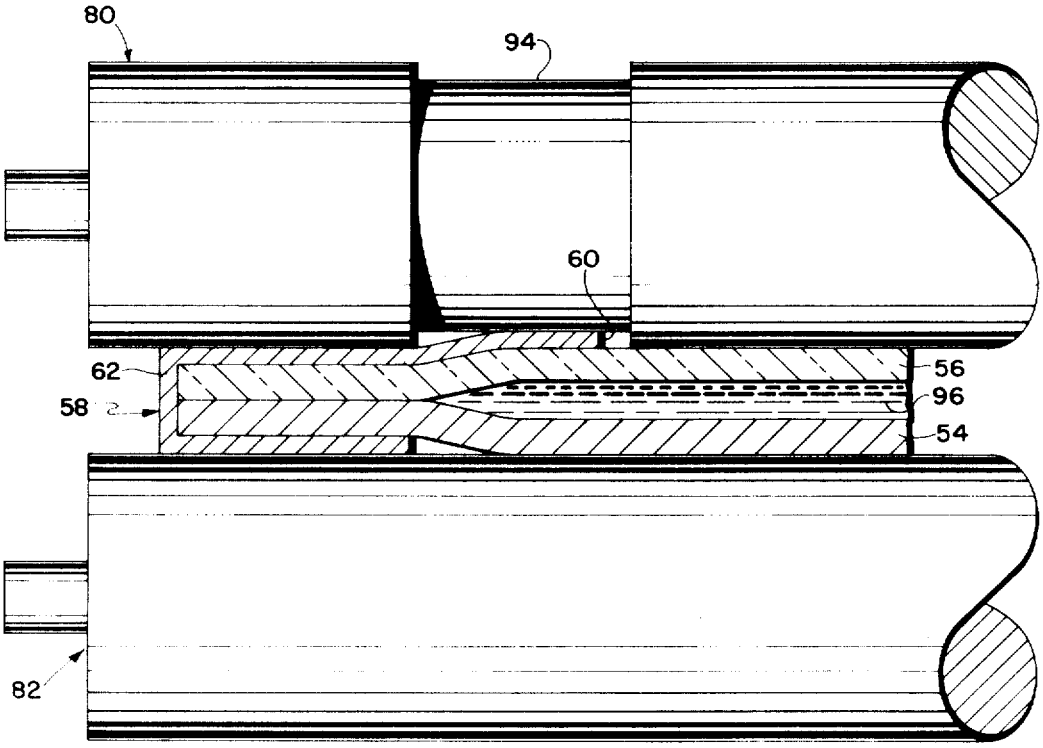
FIG. 3 is an enlarged view illustrating the apparatus and method of the invention.

A typical pair of pressure-applying members suitable for distributing the processing liquid within the film unit is illustrated in FIGS. 2 and 3 of the drawings as comprising a pair of rollers 80 and 82 mounted in juxtaposition for rotation about axes lying in a common plane. Rollers 80 and 82 have cylindrical, peripheral surfaces which cooperate to provide a convergent passage through which the film unit is moved, for example, by rotating the rollers, and the surface includes linear (axial) portions which are disposed substantially parallel with one another and define the narrowest portion of the convergent passage between the rollers. Other forms of pressure-applying members may be employed, including for example, nonrotary members having surfaces defining a convergent gap, the surfaces including linear portions that are parallel and define the narrowest portion of the gap. Although the pressure-applying members may be mounted in fixed position with respect to one another so as to provide a passage therebetween having fixed dimensions or mounted a fixed minimum distance apart, in the preferred form shown and adapted to use with a film unit comprising materials of varying thickness (e.g., the container is thinner than the film unit in the region of the binding element), the rollers are mounted for movement toward and away from one another and are resiliently biased toward one another to apply compressive pressure to all portions of the film unit (e.g., to effect complete emptying of the container).

In the camera shown in FIG. 2 of the drawings, rollers 80 and 82 are mounted in juxtaposition within the rear housing section 12 and are coupled through gears 84 and a suitable transmission (not shown) to motor 14 for driving the rolls to advance the film unit therebetween. Rolls 80 and 82 are mounted closely adjacent end wall 44 of film container 34 with the bite of the rolls aligned with withdrawal slot 46, and means are provided for advancing an exposed film unit from the container through slot 46 into the bite of the rolls. These last-mentioned means include a reciprocating film engagement member 86 including end section 88 adapted to extend into the film pack through an opening in forward wall 40 to engage the container 68 (e.g., an opening therein) of the forwardmost film unit and move the container into the bite of the rolls. A typical mechanism for reciprocating member 86 includes a pin (not shown), mounted on an end of roll 80 or gear 84, engaged in a slot 90 in a reciprocating link 92 coupled with member 86 for reciprocating the latter during rotation of roll 80. For further details of a film-feeding system of the foregoing type, reference may be had to the aforementioned application Ser. No. 713,766.

During distribution of the processing liquid, the liquid is advanced between the sheets ahead of the pressure-applying rolls as an elongated mass at least equal in length to the width of the exposed area and extending from side to side thereof. This elongated mass of liquid, as it is advanced between the sheets, forces the sheets apart to provide a space therebetween in which the liquid forms a layer. The depth of this space and the thickness of the layer is dependent upon a number of factors, principally, the spacing between the pressure-applying rolls at the narrowest portion of the gap between the rolls and the thicknesses of the photosensitive and image-receiving sheets. Proper spacing between the medial portions of the surface of the rolls, that is, those portions of the roll surfaces which engage the sheets within the region of the exposed area, is obtained by biasing end portions of the rolls into engagement with lateral marginal sections of the film unit, specifically, into engagement with the binding strips provided by lateral edge portions 62 of binding element 58. The thickness of each lateral marginal portion of the film unit is equal to the aggregate thickness of the photosensitive and image-receiving sheets and two thicknesses of the binding element, so that the spacing between the sheets and the thickness of the layer of liquid is at least equal to twice the thickness of the binding element which, in a typical film unit, may be approximately 0.002 inch and provide for a liquid layer approximately 0.004 inch thick.

As previously noted, the pressure-applying rolls tend to retain the lateral marginal portions of the photosensitive and image-receiving sheets in face-to-face contact while the medial portions of the sheets are permitted to separate to provide a space in which the processing liquid is distributed as a thin layer so that there will be a transition region intermediate these two regions in which the facing surfaces of the sheets is neither in contact nor separated by the requisite distance. The layer of liquid in these transition regions varies in thickness from nothing in the region where the sheets are in face-to-face contact, to a maximum within the exposed area defined by opening 60 in binding element 58. To insure that there will be sufficient liquid in narrow lateral regions immediately adjacent the edges of opening 60, the lateral edges of the portions of binding element 58 secured to the photosensitive sheet are located outwardly and parallel with the lateral edges of opening 60 in the binding element to enable separation of the photosensitive and image-receiving sheets in regions outside of the exposed area and underlying binding element 58. As the processing liquid is distributed between the sheets, it is absorbed by the photosensitive and image-receiving layers both within and without the exposed area of the film unit, so that there is a tendency, due to absorption of the processing liquid by the photosensitive and image-receiving layers located outside of and immediately adjacent the exposed areas, for there to be insufficient liquid within the exposed area immediately adjacent the edges thereof. It is to provide a reservoir of liquid outside of and immediately adjacent the image aera that the edges of the binding element are offset from one another along each side of the film unit.

It has been found that the additional liquid provided by the offset edges of the binding element, by itself, may be insufficient to provide sufficient processing liquid at the edges of the image area defined by opening 60 in binding element 58 and that the presence of sufficient liquid can be assured by spreading the liquid in a layer of uniform thickness beyond the edges of the image area, particularly the lateral edges thereof. Thus, as shown in FIG. 3, the layer of processing liquid is continued in undiminished thickness outwardly beyond the lateral edges of opening 60 into the region underlying the portion of the binding element secured to image-receiving sheet 56. To achieve this result, roller 80, which contacts the image-receiving sheet, is provided with shallow annular recesses 94 in its peripheral surface, the radial depth of each recess being approximately equal to the thickness of the binding element, the axial spacing between recesses being slightly less than the spacing between the lateral edges of opening 60, and the width of each recess being slightly greater than the distance by which the lateral edges of the binding element are offset from one another at each side of the film unit. The film unit is guided between the rollers in such a way that the extended lateral edge portions of the binding element secured to the image-receiving sheet are received with recesses 94 permitting narrow portions of the photosensitive and image-receiving sheets in the regions outside of and immediately adjacent the exposure area to be spaced apart substantially the same distance as the medial portions of the sheets within the image and thereby provide for distribution of the processing liquid in a uniform layer laterally beyond the edges of opening 60. Thus, because there is no diminution *in* the thickness of the layer of processing liquid within or immediately adjacent the lateral edges of the image area, processing and image-formation will be complete within the region of the image area immediately adjacent the lateral edges of opening 60 in the binding element.

During spreading of the processing liquid, the film unit is moved between the pressure-applying members in a direction substantially perpendicular to the axes of rolls 80 and 82 and parallel with the lateral edges of opening 60 in binding element 58. The film is initially guided into the bite of the rolls by sidewalls 45 of container 34 which are properly located with respect to recesses 94 in roll 80 by components of the camera, for example, forward wall 20 thereof. Once a film unit is engaged between the rolls and properly oriented with respect to the axes of rotation of the rolls, rotation of the rolls is effective to move the film unit in the desired direction with the lateral edge portions of binding element 58 properly aligned with and disposed within recesses 94. Thus, sufficient processing liquid to effect uniform development of the photosensitive material and formation of a transfer image throughout the entire exposure (image) area is assured.

Since certain changes may be made in the above apparatus and process without departing from the scope of the invention herein involved, it is intended that all matter contained in the above description or shown in the accompanying drawings shall be interpreted as illustrative and not in a limiting sense.

What is claimed is:

1. In photographic apparatus including means for processing a rectangular *exposed* area of photographic film unit including a [thereof] *pair* of elements secured in face-to-face relation at their lateral edges by external binding strips defining the lateral edges of said exposed area, by distributing a liquid processing agent in a layer between said elements at least coextensive with said exposed area, said means comprising a pair of members mounted in juxtaposition and defining a passage between said members for receiving and applying compressive pressure to an exposed film unit during movement thereof through said passage, said members *each* including *a* [portions] linear parallel surface *portion* defining the narrowest section of said passage, the improvement comprising:

said surface portion of one of said members including shallow recesses spaced by a distance slightly less than the width of the exposed area of a film unit adapted to be treated within said apparatus; and means for moving said film unit into and through said passage between said members with lateral edge portions of said binding strips disposed within said recesses and end sections of said surface portions of said members engaged with and spaced apart by said binding strips at the lateral edges of said film unit.

2. Photographic apparatus as defined in claim 1 wherein said one member is a cylindrical roller and said shallow recesses comprise annular grooves in the peripheral surface of said roller.

3. Photographic apparatus as defined in claim 2 wherein said means for moving said film unit include means for rotating said roller in engagement with said film unit to advance said film unit between said roller and the other of said members.

4. Photographic apparatus as defined in claim 3 wherein said other member comprises a roller having a substantially cylindrical peripheral surface.

5. Photographic apparatus as defined in claim 4 wherein said means for moving said film unit include means for rotating both of said rollers in engagement with a film unit to advance said film unit between said rollers in a direction parallel with the lateral edges of the exposed area of said film unit.

6. In a method of treating a photographic film unit including a photosensitive, image-recording sheet and a second sheet secured in face-to-face relation by binding strips secured around and to the lateral margins of said sheets, to produce a visible image in said film unit, an area of said photosensitive sheet intermediate said binding strips and extending thereto having been exposed to actinic radiation transmitted through one of said sheets to produce an image in said area of said photosensitive sheet and wherein a viscous liquid processing agent is introduced between said shets adjacent a transverse edge of said exposed area, the improvement comprising:

distributing a viscous liquid processing agent between said sheets in a substantially uniform layer at least coextensive with said area and extending laterally beyond the edges thereof by moving said film unit lengthwise, beginning in the region of said viscous liquid, through a gap defined by *a* substantially parallel [portions] *portion* of *each of* the surfaces of a pair of juxtaposed pressure-applying members resiliently biased toward one another, one of said surfaces including a pair of recesses spaced apart from one another by a distance slightly less than the width of said area and having a depth at least approximate equal to the thickness of said binding strips;

moving said film unit between and in engagement with said surfaces with said binding strips aligned with said recesses so that the lateral edge portions of said binding strips located inwardly from the lateral edges of said film unit are located within said recesses and said pressure-applying members are spaced apart from one another by engagement of said surfaces of said members with said binding strips in the regions thereof immediately adjacent the lateral edges of said film unit.

7. In the method of treating a photographic film unit defined in claim [16] *6*, moving said film unit between said pressure-applying members with said second sheet located in contact with said one surface and portions of said binding strips secured to said second sheet located within said recesses.

8. In the method of treating a photographic film unit defined in claim [16] *6* wherein said pressure-applying member providing said one surface is a roller, rotating said roller in contact with one of said sheets and said binding strips during movement of said film unit between said pressure-applying members.

9. In a method of producing a visible photographic image utilizing a film unit comprising a first sheet including a layer of a photosensitive image-recording medium and having generally parallel lateral edges, a second sheet at least laterally coextensive with said first sheet and arranged in face-to-face relation therewith with said layer of said image-recording medium innermost and binding strips secured to the outside of said sheets at the lateral margins thereof to retain said sheets in face-to-face relation, said binding strips having longitudinal edges extending substantially parallel with said lateral edges of said sheets and spaced inwardly therefrom toward one another to define the lateral edges of an area in which a visible image is formed between said sheets, said image-recording medium having been exposed to the action of light to produce an image in said area bounded at opposite sides by said longitudinal edges of said binding strips and wherein a quantity of a viscous liquid processing agent is introduced between said sheets adjacent a transverse edge of said area, the improvement comprising:

distributing said processing [liquid] *agent* between said sheets in a uniformly thin layer at least coextensive with said area and extending laterally beyond the lateral edges of said area by moving said film unit lengthwise relative to and between a pair of pressure-applying members having juxtaposed [press$re] *pressure*-applying surfaces, one of which includes recesses spaced from one another by a distance slightly less than the spacing between said lateral edges of said area and each having a depth at least substantially equal to the thickness of said binding strips;

during movement of said film unit between said pressure-applying members, guiding said film unit so that portions of said members engage said binding elements adjacent said lateral edges of said film unit and are spaced apart by the combined thickness of said sheets and said binding strips and longitudinal edge portions of said binding elements are received within said recesses to permit the [sepiration] *separation* of said sheets within regions underlying said portions of binding strips during movement of said film unit between said pressure-applying members; and reacting said processing agent with said exposed image-recording medium to produce a visible image between said sheets extending at least to said lateral edges of said area.

10. In the method of producing a visible photographic image defined in claim [16] *9*, exposing said image-recording medium through said second sheet.

11. In the method of producing a visible photographic image defined in claim [16] *9* adapted to utilize pressure-applying members in which *said longitudinal edges of said binding strips are offset from one another at each side of said film unit and* the width of each of said recesses slightly exceeds the spacing between said *offset* longitudinal edges of said binding strips, guiding said film unit so that edge portions of said binding strips secured to said [other] *second* sheet are received within said recesses during movement of said film unit between said pressure-applying members.

12. In the method of producing a visible photographic image defined in claim 11, exposing said image-recording medium by light transmitted through said second sheet.

13. In the method of producing a visible photographic image defined in claim [17] *9*, wherein said one pressure-applying member is a roller, said pressure-applying surface thereof is cylindrical, and said recesses of said cylindrical [press$re] *pressure*-applying surface include recessed cylindrical surfaces having a radius differing from the first-mentioned cylindrical pressure-applying surface by approximately the thickness of said binding strips, rotating said roller in contact with one of said sheets during movement of said film unit between said pressure-applying members.

References Cited

The following references, cited by the Examiner, are of record in the patented file of this patent or the original patent.

UNITED STATES PATENTS

| | | | |
|---|---|---|---|
| 3,152,529 | 10/1964 | Erlichman | 95—13 |
| 3,473,925 | 10/1969 | Milligan et al. | 96—3 |
| 3,479,184 | 11/1969 | Land et al. | 96—29 X |

RONALD H. SMITH, Primary Examiner

J. L. GOODROW, Assistant Examiner

U.S. Cl. X.R.

95—13